US009146615B2

(12) United States Patent
Scherpa

(10) Patent No.: US 9,146,615 B2
(45) Date of Patent: Sep. 29, 2015

(54) UPDATING CONTENT OF A LIVE ELECTRONIC PRESENTATION

(75) Inventor: Josef A. Scherpa, Fort Collins, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 211 days.

(21) Appl. No.: 13/530,178

(22) Filed: Jun. 22, 2012

(65) Prior Publication Data

US 2013/0346868 A1 Dec. 26, 2013

(51) Int. Cl.
| | |
|---|---|
| G06F 17/21 | (2006.01) |
| G06F 17/24 | (2006.01) |
| G06F 3/00 | (2006.01) |
| G06F 3/0481 | (2013.01) |
| G11B 27/034 | (2006.01) |
| H04N 21/2368 | (2011.01) |
| G06F 3/01 | (2006.01) |

(52) U.S. Cl.
CPC ............... *G06F 3/01* (2013.01); *G06F 3/0481* (2013.01); *G06F 17/211* (2013.01); *G06F 17/24* (2013.01); *G06F 17/241* (2013.01); *G11B 27/034* (2013.01); *H04N 21/2368* (2013.01)

(58) Field of Classification Search
CPC ..... G06F 17/24; G06F 17/211; G06F 17/241; G06F 3/002; G06F 3/0481; G11B 27/034; H04N 21/2368
USPC .................................. 715/201, 203, 730, 732
See application file for complete search history.

(56) References Cited

U.S. PATENT DOCUMENTS

| | | | | |
|---|---|---|---|---|
| 6,993,246 | B1* | 1/2006 | Pan et al. ...................... | 386/201 |
| 7,734,802 | B1* | 6/2010 | Gay et al. ..................... | 709/231 |
| 8,086,960 | B1* | 12/2011 | Gopalakrishna et al. ..... | 715/266 |
| 8,091,034 | B2 | 1/2012 | Barbee et al. | |
| 2002/0085030 | A1* | 7/2002 | Ghani ........................... | 345/751 |
| 2002/0087496 | A1* | 7/2002 | Stirpe et al. ..................... | 706/45 |
| 2002/0120939 | A1* | 8/2002 | Wall et al. ....................... | 725/87 |
| 2002/0129052 | A1* | 9/2002 | Glazer et al. ................ | 707/501.1 |
| 2002/0135536 | A1* | 9/2002 | Bruning ......................... | 345/1.1 |
| 2003/0034999 | A1* | 2/2003 | Coughlin et al. .............. | 345/738 |
| 2004/0002049 | A1* | 1/2004 | Beavers et al. ................ | 434/350 |
| 2004/0113935 | A1* | 6/2004 | O'Neal et al. ................. | 345/732 |
| 2004/0143603 | A1* | 7/2004 | Kaufmann et al. ......... | 707/104.1 |
| 2005/0024387 | A1* | 2/2005 | Ratnakar et al. ............... | 345/629 |
| 2005/0102360 | A1* | 5/2005 | Chavis et al. ................. | 709/205 |
| 2005/0240407 | A1* | 10/2005 | Simske et al. ................ | 704/246 |
| 2006/0075348 | A1* | 4/2006 | Xu et al. ......................... | 715/730 |
| 2007/0100938 | A1* | 5/2007 | Bagley et al. ................. | 709/204 |
| 2007/0100939 | A1* | 5/2007 | Bagley et al. ................. | 709/204 |
| 2007/0186147 | A1* | 8/2007 | Dittrich ....................... | 715/500.1 |
| 2007/0198698 | A1* | 8/2007 | Boyd et al. .................... | 709/224 |

(Continued)

*Primary Examiner* — Eric J Bycer
(74) *Attorney, Agent, or Firm* — Patents on Demand P.A.; Brian K. Buchheit; Scott M. Garrett

(57) ABSTRACT

A method for updating the content of a live presentation can begin with an electronic presentation system establishing an electronic presentation session between a presenter and an audience. The presenter can control the presentation of digital content stored in a presentation source file within a user interface that facilitates the electronic presentation session. During the presentation, content changes for the digital content of the presentation source file can be received. The digital content of the presentation source file can be dynamically updated with the received content changes without interrupting the presentation of the digital content to the audience.

20 Claims, 5 Drawing Sheets

(56) References Cited

U.S. PATENT DOCUMENTS

| | | | |
|---|---|---|---|
| 2007/0282948 A1* | 12/2007 | Praino et al. | 709/204 |
| 2008/0005244 A1* | 1/2008 | Vernon et al. | 709/204 |
| 2008/0098295 A1* | 4/2008 | Nelson et al. | 715/233 |
| 2008/0303748 A1* | 12/2008 | Borhade | 345/2.2 |
| 2009/0327897 A1* | 12/2009 | Serpico et al. | 715/731 |
| 2010/0031152 A1 | 2/2010 | Villaron et al. | |
| 2010/0037151 A1* | 2/2010 | Ackerman et al. | 715/753 |
| 2010/0257449 A1* | 10/2010 | Lieb et al. | 715/730 |
| 2011/0167346 A1 | 7/2011 | Lye et al. | |
| 2011/0196928 A1* | 8/2011 | Pryhuber | 709/204 |
| 2012/0023407 A1* | 1/2012 | Taylor | 715/731 |
| 2012/0192055 A1* | 7/2012 | Antebi et al. | 715/229 |
| 2012/0198335 A1* | 8/2012 | Huang | 715/716 |
| 2012/0278738 A1* | 11/2012 | Kruse et al. | 715/754 |
| 2013/0132852 A1* | 5/2013 | Sommer | 715/736 |
| 2013/0232420 A1* | 9/2013 | Manzari et al. | 715/730 |

* cited by examiner

UPDATING CONTENT OF A LIVE ELECTRONIC PRESENTATION

BACKGROUND

The present invention relates to the field of electronic communications.

A wide variety of software systems exist to allow geographically-separated people to collectively participate in a single online event like a meeting. Software systems that allow a presentation to be shared with or presented to an audience are commonly used for sales and educational activities. In a conventional electronic presentation system, once the source file of the presentation is loaded, changes to the source file must be made outside of the presentation system. That is, the presenter needs to interrupt the presentation to close the source file, make the changes using an editing application, reopen the file in the presentation system, and then return to the previous point in the presentation.

This process for updating the content of a live presentation using a conventional presentation system not only disrupts the flow of the presentation, but is also cumbersome and often embarrassing to the presenter. Essentially, the presenter or other appropriate users are unable to update the content of a live presentation using a conventional presentation system.

Other software systems like an online collaboration system have the capability to allow real-time and simultaneous modification of a file. However, in an online collaboration session, all the members of the collaboration have the ability to edit the content of the source file or file being collaborated upon; granting the entire audience the ability to make modifications to the content of the presentation is an undesirable feature for a presentation. Further, an online collaboration system does not typically support the functionality desired for conducting a presentation.

BRIEF SUMMARY

One aspect of the present invention can include a method for updating the content of a live presentation. Such a method can begin with an enhanced electronic presentation system establishing a selectively-collaborative electronic presentation session between a presenter and an audience. The presenter can control the presentation of digital content stored in a presentation source file within a user interface that facilitates the selectively-collaborative electronic presentation session. During the presentation, content changes for the digital content of the presentation source file can be received. The digital content of the presentation source file can be dynamically updated with the received content changes without interrupting the presentation of the digital content to the audience.

Another aspect of the present invention can include a system for updating the content of a live presentation. Such a system can include a presentation source file containing digital content, content changes to the digital content of the presentation source file, a predefined edit list defining users allowed to modify the digital content of the presentation source file, and an enhanced electronic presentation system. The enhanced electronic presentation system can be configured to manage a selectively-collaborative electronic presentation session between a presenter and an audience. The enhanced electronic presentation system can allow only audience members indicated on the predefined edit list to submit the content changes during the presentation. The content changes can be dynamically applied to the digital content of the presentation source file without interruption to the presentation.

Yet another aspect of the present invention can include a computer program product that includes a computer readable storage medium having embedded computer usable program code. The computer usable program code can be configured to establish a selectively-collaborative electronic presentation session between a presenter and an audience. The presenter can control the presentation of digital content stored in a presentation source file within a user interface that facilitates the selectively-collaborative electronic presentation session. The computer usable program code can be configured to, during the presentation, receive content changes for the digital content of the presentation source file. The computer usable program code can also be configured to dynamically update the digital content of the presentation source file with the received content changes without interrupting the presentation of the digital content to the audience.

DETAILED DESCRIPTION

Figure 1:
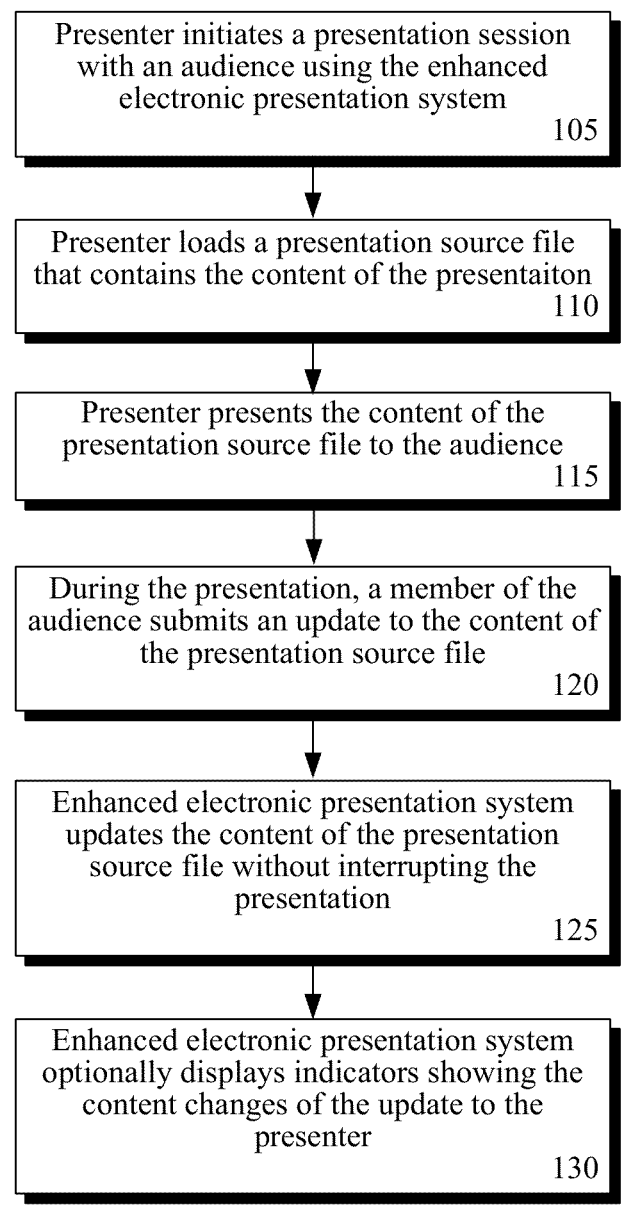
FIG. 1 is a flowchart of a method describing the general use of an enhanced electronic presentation system to selectively enable designated audience members to modify the digital content of a presentation in accordance with embodiments of the inventive arrangements disclosed herein.

The present invention discloses a solution for updating the content of a live presentation by selectively enabling modification of the presentation's source file by preselected audience members. An enhanced electronic presentation system can be used to establish a selectively-collaborative electronic presentation session between a presenter and an audience. The presenter can control which audience members are able to submit content changes to the content of the presentation using an edit list. During the presentation, audience members specified on the edit list can have the ability to submit content changes, while the remainder of the audience is unable to modify the presentation's content. The enhanced electronic presentation system can then apply the content changes to the presentation's content without interrupting the presentation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing the general use of an enhanced electronic presentation system to selectively enable designated audience members to modify the digital content of a presentation in accordance with embodiments of the inventive arrangements disclosed herein.

Method 100 can begin in step 105 where a presenter can initiate a presentation session with an audience using an enhanced electronic presentation system. The presenter can load a presentation source file that contains the content of the presentation in step 110. In step 115, the presenter can present the content of the presentation source file to the audience.

During the presentation, a member of the audience can submit an update to the content of the presentation source file in step 120. In step 125, the enhanced electronic presentation system can update the content of the presentation source file without interrupting the presentation. The enhanced electronic presentation system can, optionally, display indicators to the presenter that show the content changes contained in the update in step 130.

Steps 105-115 can be performed in a similar manner to conventional software applications that allow audio/visual conferencing between multiple users (i.e., the presenter and the audience) over a network and/or the Internet. However, steps 120-130 can illustrate functionality of the enhanced electronic presentation system that is lacking in conventional electronic presentation software applications.

That is, the enhanced electronic presentation system can allow for updates to be submitted and applied to the content of the presentation source file simultaneous with the content's presentation in a manner that is relatively seamless to the audience. In a conventional electronic presentation session, the audience can only view the presentation presented by the presenter. To make a change to or update the content of the presentation source file during the presentation, the presenter can be required to interrupt the presentation to close the presentation source file, make the changes using an appropriate content editor, reopen the modified presentation source file in the presentation system, and then return to the previous point in the presentation. This disruption to the presentation can be eliminated using the enhanced electronic presentation system, as described by steps 120-130.

Figure 2:
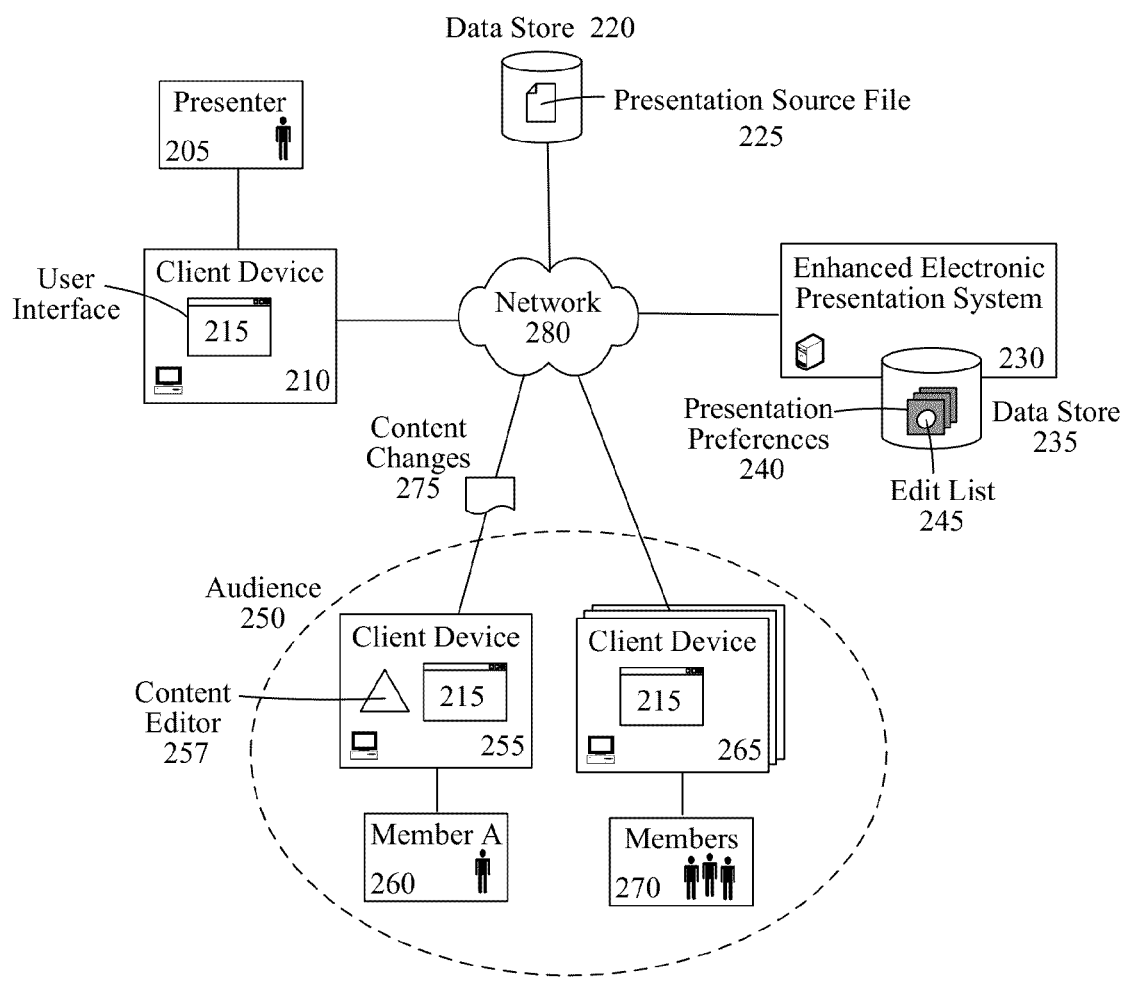
FIG. 2 is a schematic diagram illustrating a system that utilizes an enhanced electronic presentation system to selectively enable an audience member to modify the contents of a presentation source file during a presentation in accordance with an embodiment of the inventive arrangements disclosed herein.

FIG. 2 is a schematic diagram illustrating a system 200 that utilizes an enhanced electronic presentation system 230 to selectively enable an audience 250 member 260 to modify the contents of a presentation source file 225 during a presentation in accordance with embodiments of the inventive arrangements disclosed herein. System 200 can be used within the context of method 100.

In system 200, a presenter 205, the person running the presentation, can use a user interface 215 of the enhanced electronic presentation system 230 to present the contents of a presentation source file 225 to an audience 250. The user interface 215 can be a graphical interaction mechanism operating upon a client device 210, 255, and 265 by which the presenter 205 and audience 250 communicate with each other and the enhanced electronic presentation system 230.

The client device 210 can represent a variety of computing devices capable of supporting operation of the user interface 215 and communicating with the enhanced electronic presentation system 230 over the network 280. The presentation source file 225 can be a digital file stored in a data store 220 that the presenter 205 shares with the audience 250 over the network 280 via the user interface 215. In an alternate embodiment, the data store 220 containing the presentation source file 225 can be a component of the presenter's 205 client device 210 (i.e., a local data store 220 of the client device 210).

The enhanced electronic presentation system 230 can represent the hardware and/or software components required to enable the dynamic application of content changes 275 to the content of a presentation source file 225 during its presentation. In essence, the enhanced electronic presentation system 230 can be thought of as a software system that combines the real-time multi-user editing functionality of an online collaboration system with an electronic presentation or broadcast system.

Online collaboration systems and electronic presentation systems are well-known in the art as separate, independent systems, and need not be discussed at length herein. In online collaboration, all participants of the collaboration session can access and modify the document under collaboration in real-time or near real-time. In an electronic presentation, the presenter 205 controls the presentation of the presentation source file 225 to the audience 250, and the audience 250 is unable to modify the presentation source file 225.

The enhanced electronic presentation system 230 can establish a presentation session between the presenter 205 and audience 250 that is selectively-collaborative. That is, only specific members 260 of the audience 250 can be granted the ability to modify the contents of the presentation source file 225 during the presentation, while the remaining members 270 can only view the presentation. The ability to modify the presentation source file 225 can be controlled by the enhanced electronic presentation system 230 via an edit list 245.

The edit list 245 can be a listing of the members 260 of the audience 250 who are allowed to edit the presentation source file 225 during the presentation. The edit list 245 can be created when the presenter 205 designates the audience 250 for the presentation.

In the embodiment shown in system 200, the edit list 245 can be a separate data element contained within a set of presentation preferences 240 defined for the presentation. The presentation preferences 240 can define a set of variables whose values are configurable by the presenter 205 that affect the general operation of the enhanced electronic presentation system 230 and/or the handling of content change 275 application.

In another contemplated embodiment, the edit list 245 can be implemented as a binary data element added to a data table that lists the audience 250 members 260 and 270. For example, such a data table can list the names of all the members 260 and 270 of the audience 250 and include a column indicating edit capability that accepts a TRUE/FALSE value.

Those members 260 of the audience 250 on the edit list 245 can be provided with the means (e.g., an enabled button in the user interface 215) to access a content editor 257 that is appropriate for the content of the presentation source file 225. The content editor 257 can be a software application designed to create and/or modify a specific type of data and/or file format. The content editor 257 can be a software program local to the client device 255 of the member 260 submitting the content changes 275, a local instantiation of a content editor 257 available over the network 280, or can be a functionality provided by a plug-in component of the user interface 215.

For example, the user interface 215 presented to Member A 260 can have an Edit Button that is selectable. Selection of the Edit Button by Member A 260 can launch a the content editor 257 installed upon the client device 255 that is appropriate for the presentation source file 225 being presented (e.g., a slide show editor for a slide presentation, a spreadsheet application when a spreadsheet is being presented, etc.).

The member 260 can then use the content editor 257 to submit content changes 275 for the presentation source file 225 to the enhanced electronic presentation system 230. The enhanced electronic presentation system 230 can then apply the content changes 275 to the presentation source file 225, updating the content being presented.

Updating of the presentation source file 225 with the content changes 275 can be performed in a variety of ways that are commensurate with the specific implementation of the enhanced electronic presentation system 230 as well as the capabilities of the underlying architecture and/or configuration of the components of the system 200. Approaches for real-time editing (i.e., content collaboration) are well-known in the art like those taught by U.S. Patent 2010/0257457A1.

It is important to emphasize that the updating of the presentation source file 225 by the enhanced electronic presentation system 230 can be performed in such a manner that the overall presentation is uninterrupted. That is, application of the content changes 275 to the presentation source file 225 need not require the presenter 205 to be close, modify, and reopen the presentation source file 225, as required by conventional electronic presentation systems.

For example, the presenter 205 can be currently presenting Slide 4 to the audience 250. Member A 260 can be proofreading the entire presentation and submit content changes 275 that affect Slides 5 and 8. As the presenter 205 advances the presentation to Slide 5, the content of Slide 5 can reflect the content changes 275 submitted by Member A 260; the other members 270 of the audience 250 can be unaware that Member A 260 made any corrections to Slide 5.

Since the content changes 275 are applied in real-time, the enhanced electronic presentation system 230 can be further configured to separate received content changes 275 based upon whether the corresponding content of the presentation source file 225 has been presented. The content changes 275 for content that has yet to be presented can then be applied first or before the content changes 275 for content that was already presented, in order insure that more pressing content changes 275 are available for presentation.

It is also important to note that the teachings of the present disclosure can be applied to a variety of media. That is, the teachings of the present disclosure can be applied to streaming audio and/or video from a source (the presenter 205) to the audience 250, akin to an augmented reality broadcast that is able to be augmented by multiple designated members 260.

Network 280 can include any hardware/software/and firmware necessary to convey data encoded within carrier waves. Data can be contained within analog or digital signals and conveyed though data or voice channels. Network 280 can include local components and data pathways necessary for communications to be exchanged among computing device components and between integrated device components and peripheral devices. Network 280 can also include network equipment, such as routers, data lines, hubs, and intermediary servers which together form a data network, such as the Internet. Network 280 can also include circuit-based communication components and mobile communication components, such as telephony switches, modems, cellular communication towers, and the like. Network 280 can include line based and/or wireless communication pathways.

As used herein, presented data stores 220 and 235 can be a physical or virtual storage space configured to store digital information. Data stores 220 and 235 can be physically implemented within any type of hardware including, but not limited to, a magnetic disk, an optical disk, a semiconductor memory, a digitally encoded plastic memory, a holographic memory, or any other recording medium. Data stores 220 and 235 can be a stand-alone storage unit as well as a storage unit formed from a plurality of physical devices. Additionally, information can be stored within data stores 220 and 235 in a variety of manners. For example, information can be stored within a database structure or can be stored within one or more files of a file storage system, where each file may or may not be indexed for information searching purposes. Further, data stores 220 and/or 235 can utilize one or more encryption mechanisms to protect stored information from unauthorized access.

Figure 3:
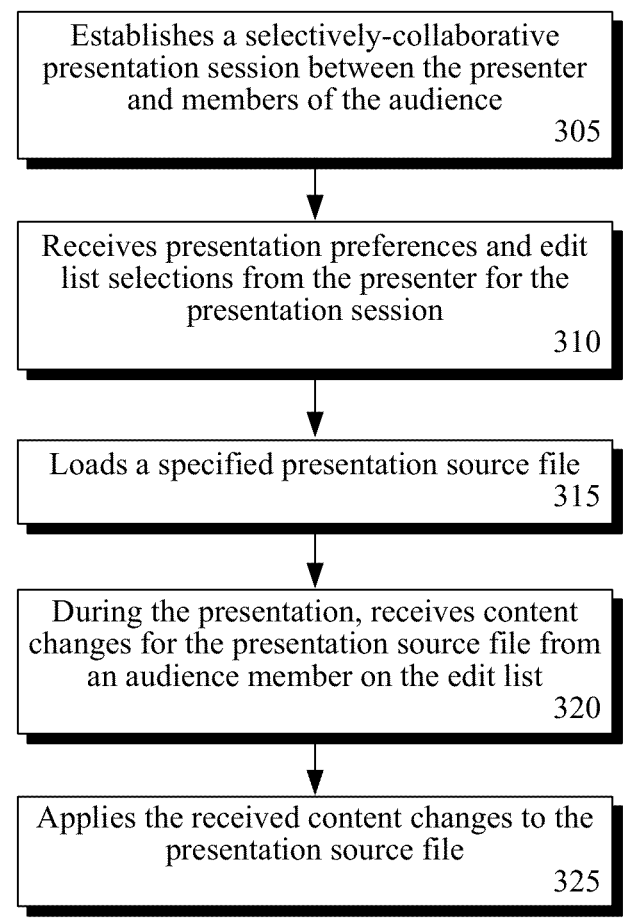
FIG. 3 is a flowchart of a method describing the basic operation of the enhanced electronic presentation system in accordance with an embodiment of the inventive arrangements disclosed herein.

FIG. 3 is a flowchart of a method 300 describing the basic operation of the enhanced electronic presentation system in accordance with embodiments of the inventive arrangements disclosed herein. Method 300 can be performed within the context of method 100 and/or system 200.

Method 300 can begin in step 305 where the enhanced electronic presentation system can establish a selectively-collaborative electronic presentation session, herein referred to as the presentation session, between the presenter and members of the audience. As with conventional electronic presentation and/or meeting systems, identifiers for the members of the audience can be selected or entered by the presenter.

Presentation preferences and edit list selections can be received from the presenter for the presentation session in step 310. As previously mentioned, the designation of audience members for the edit list can alternately be included in the performance of step 305. In step 315, a presentation source file specified by the presenter can be loaded. The loaded presentation source file can contain the content of the presentation.

During the presentation, content changes for the presentation source file can be received from an audience member contained on the edit list in step 320. In step, 325, the enhanced electronic presentation system can apply the received content changes to the presentation source file.

Figure 4:
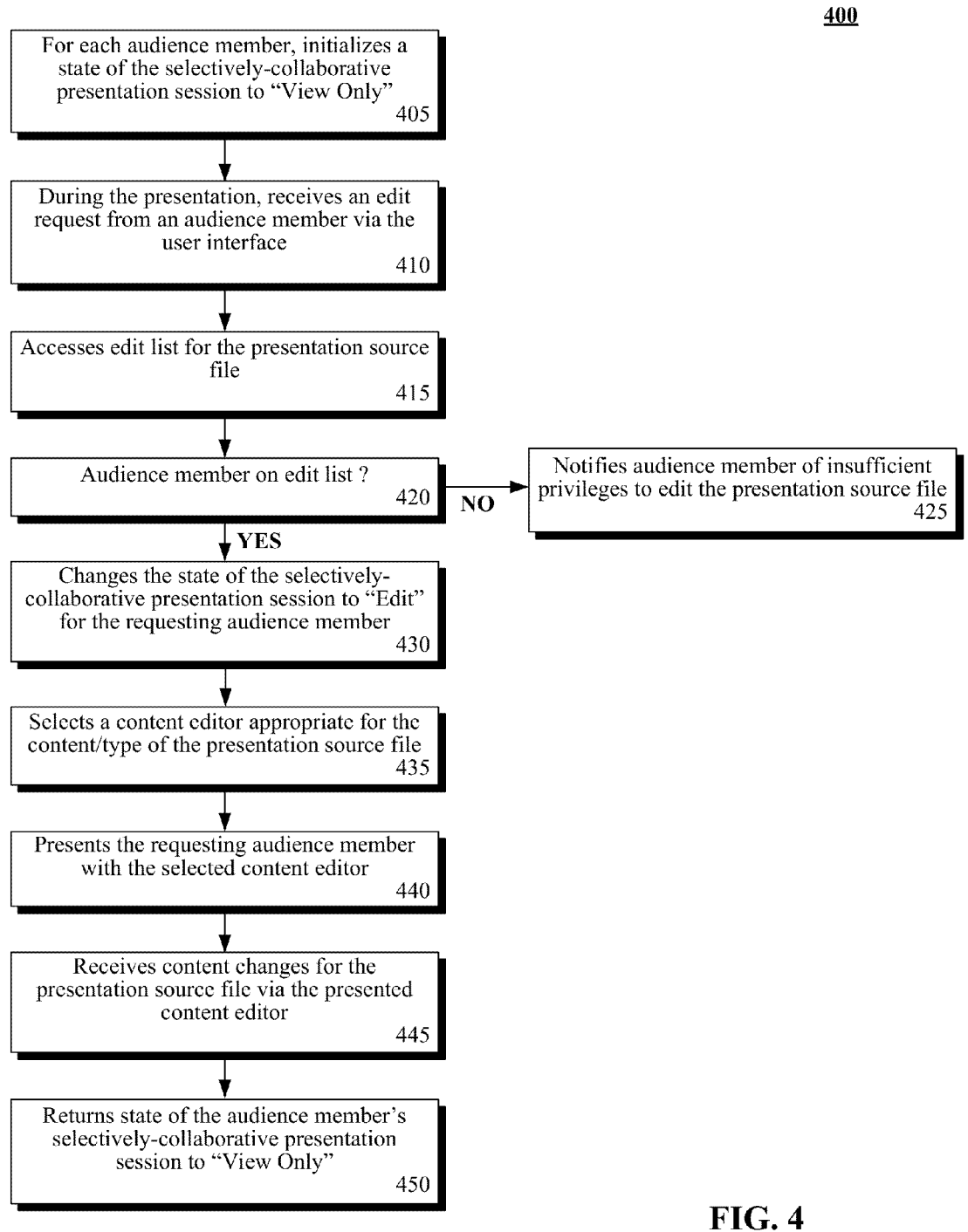
FIG. 4 is a flowchart of a method detailing an example means of handling the submission of content changes by the enhanced electronic presentation system in accordance with embodiments of the inventive arrangements disclosed herein.

FIG. 4 is a flowchart of a method 400 detailing an example means of handling the submission of content changes by the enhanced electronic presentation system in accordance with embodiments of the inventive arrangements disclosed herein. Method 400 can be performed within the context of system 200, and/or in conjunction with methods 100 and/or 300.

Method 400 can begin in step 405 where the enhanced electronic presentation system can initialize a state of the selectively-collaborative electronic presentation session to a "View Only" value for each audience member, allowing audience members only the ability to view the contents of the presentation source file as the presenter conducts the presentation. During the presentation, an edit request can be received from an audience member via the user interface (i.e., the audience member clicks an Edit button) in step 410.

In step 415, the edit list for the presentation source file can be accessed. It can be determined if the requesting audience member is on the edit list in step 420. When the requesting audience member is not on the edit list for the presentation source file, step 425 can execute where the requesting audience member can be notified that they have insufficient privileges to edit the presentation source file.

When the requesting audience member is on the edit list for the presentation source file, the state of the requesting audience member's selectively-collaborative electronic presentation session can be changed to "Edit" in step 430, allowing the requesting audience member to modify the contents of the presentation source file. In step 435, a content editor appropriate for the content and/or type of the presentation source file can be selected.

The selected content editor can be presented to the requesting audience member in step 440. In step 445, content changes for the presentation source file can be received via the presented content editor. The state of the audience member's selectively-collaborative electronic presentation session can be returned to "View Only" in step 450.

It should be noted that only the state variable for an audience member that has been designated as having edit privileges for the presentation source file can be changed to allow modifications by only that audience member; the state of the selectively-collaborative electronic presentation session for the remaining audience members can remain as "View Only".

Further, multiple audience members on the edit list can simultaneously submit content changes for the presentation source file. The enhanced electronic presentation system can include functionality known in the art for the resolution of simultaneous modifications.

Figure 5:
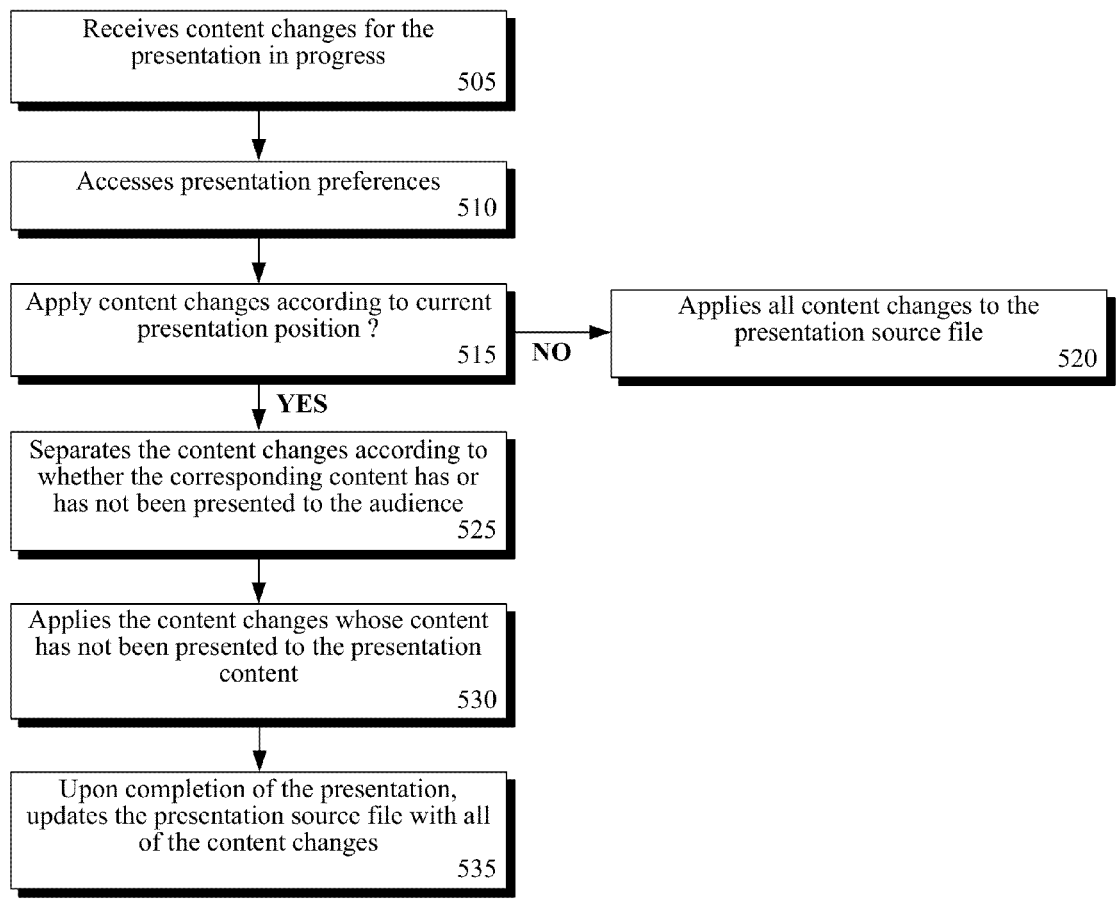
FIG. 5 is a flowchart of a method illustrating an example approach used by the enhanced electronic presentation system for applying content changes to the presentation source file in accordance with embodiments of the inventive arrangements disclosed herein.

FIG. 5 is a flowchart of a method 500 illustrating an example approach used by the enhanced electronic presentation system for applying content changes to the presentation source file in accordance with embodiments of the inventive arrangements disclosed herein. The steps of method 500 can be performed within the context of system 200, and/or methods 100, 300, and/or 400.

Method 500 can begin in step 505 where the enhanced electronic presentation system can receive content changes for the presentation that is in progress. The presentation preferences for the presentation can be accessed in step 510. In step 515, it can be determined if the presentation preferences indicate that the content changes are to be applied according to the current position of the presentation.

When the presentation preferences of the presentation does not indicate that the content changes are to be applied based upon the current position of the presentation, step 520 can be performed where the all of the content changes are applied to the presentation source file at one time. When the presentation preferences of the presentation indicate that the content changes are to be applied based upon the current position of the presentation, the content changes can be separated according to whether the corresponding content has or has not been presented to the audience in step 525.

In step 530, the content changes whose content has not been presented to the audience can then be applied to the presentation content. That is, the group of content changes whose content has not been presented can be applied to a local copy of the presentation source file stored in memory, which need not imply that the content changes are reflected in the actual presentation source file. However, this can allow the content changes to be reflected upon the yet-to-be presented content as the presenter conducts the presentation.

Upon completion of the presentation, the presentation source file can be updated with all of the content changes in step 535 to permanently store the content changes. Saving all the content changes to the presentation source file upon completion of the presentation can be beneficial because the audience would experience or notice less delay than when the enhanced electronic presentation system stores the content changes during the presentation, as in step 520. While the time delay would be relatively small, particularly in comparison to session reinstantiation, the delay can be minimized by only applying the content changes for the content that has yet to be presented, assuming a linear progression of the content in the presentation source file, to the corresponding content stored in memory.

Other approaches to the application of the content changes to the presentation source file and/or content of the presentation source file stored in memory can be utilized by the enhanced electronic presentation system without departing from the spirit of the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In a presentation session between a presenter and an audience facilitated by an electronic presentation system, where a presenter of the presentation session controls, via a user interface, a presentation of digital content stored in a presentation source file, a method comprising:
   in the presentation session, receiving content changes for the digital content of the presentation source file; and
   modifying original content of the presentation source file with the received content changes without interrupting the presentation session, wherein at least one of the receiving and the modifying is performed by a computing device.

2. The method of claim 1, further comprising:
   initializing a state of the electronic presentation session between the presenter and each member of the audience to allow the audience to only view the digital content being presented.

3. The method of claim 2, wherein the receiving of the content changes during the presentation further comprises:
   upon receipt of an edit request from an audience member via the user interface, ascertaining permissions of the audience member for editing the digital content of the presentation source file, wherein the permissions for editing the presentation source file are defined by at least one of the electronic presentation system, a file management system housing the presentation source file, and an operating system;
   responsive to the ascertained permissions of the audience member indicating that the audience member is allowed to edit the digital content, changing the state of the electronic presentation session for the audience member that sent the edit request to allow editing of the digital content, wherein the state of the electronic presentation session for a remainder of the audience remains unchanged; and
   providing the audience member with a content editor appropriate for a type of the presentation source file, wherein the content changes are made to the presentation source file within the content editor.

4. The method of claim 3, further comprising:
   responsive to the ascertained permissions of the audience member indicating that the audience member is not allowed to edit the digital content, denying the edit request from the audience member, wherein the state of the electronic presentation session for the audience member remains unchanged from the initialized state.

5. The method of claim 1, wherein the receiving of the content changes during the presentation further comprises:
   detecting an update to the presentation source file made by at least one secondary user, wherein the update represents the content changes made to the presentation source file using a content editor external to the electronic presentation system and the electronic presentation session, wherein the update occurs simultaneous with the presentation, wherein the presentation source file is capable of being simultaneously accessed by multiple software applications and multiple users.

6. The method of claim 1, wherein the receiving of the content changes during the presentation further comprises:
   presenting at least one indicator to the presenter but not to the audience, wherein the presented at least one indicator displays the content changes.

7. The method of claim 1, wherein modifying the original content further comprises:
   bifurcating the received content changes into updates to a portion of the digital content yet to be presented and updates to a portion of the digital content already presented; and
   updating the portion of the digital content yet to be presented m a different manner from the portion of the digital content already presented.

8. The method of claim 7, wherein the portion of the digital content yet to be presented is updated during the electronic presentation session, and wherein the portion of the digital content already presented is updated after the electronic presentation session has ended.

9. The method of claim 1, wherein establishing the electronic presentation session further comprises:
   receiving, from the presenter, values for an edit list that defines audience members of the electronic presentation session that are allowed to modify the original content of the presentation source file.

10. A system for updating the content of a live presentation comprising:
    at least one processor;

at least one storage device comprising program instructions executable by the at least one processor;
a presentation source file containing digital content, wherein the presentation source file is stored in the at least one storage device;
at least a portion of the program instructions configured to detect at least one content change to the original content of the presentation source file;
a predefined edit list defining users allowed to modify the original content of the presentation source file, wherein said predefined edit list is stored in the at least one storage device; and
an electronic presentation system, comprising the at least one processor and at least a portion of the program instructions, configured to manage a electronic presentation session between a presenter and an audience, wherein the electronic presentation system only allows audience members indicated on the predefined edit list to submit the at least one content change to the presentation source file during a presentation session, wherein the at least one content change is dynamically applied to the original content of the presentation source file without interruption to the presentation session, wherein submission of a content change by an audience member to the presentation source file does not change the state of the presentation session for other audience members.

11. The system of claim 10, wherein the electronic presentation system dynamically controls the state of the electronic presentation session, wherein the state of the electronic presentation session for an audience member submitting the at least one content change is temporarily modified to enable submission.

12. The system of claim 10, wherein the electronic presentation system further comprises:
a plurality of content editors for modifying various types of presentation source files; and
a user interface configured to facilitate the presentation of the presentation source file and provide audience members specified on the predefined edit list with a content editor from the plurality of content editors to submit the at least one content change for the presentation source file.

13. The system of claim 12, wherein the user interface is further configured to provide only the presenter with at least one indicator expressing the at least one content change, wherein the at least one indicator displays the at least one content change to the presenter, wherein the presenter is able to approve or reject each content change prior to application of the at least one content change to the presentation source file.

14. The system of claim 10, wherein the digital content comprises streaming video.

15. A computer program product comprising a non-transitory computer readable storage medium storing computer usable program code, the computer usable program code comprising:
computer usable program code configured to establish an electronic presentation session between a presenter and an audience, wherein the presenter controls a presentation of digital content stored in a presentation source file within a user interface that facilitates the electronic presentation session;
computer usable program code configured to, during the presentation, receive content changes for the digital content of the presentation source file; and
computer usable program code configured to modify original content of the presentation source file with the received content changes without interrupting the presentation session.

16. The computer program product of claim 15, wherein establishing the electronic presentation session further comprises:
computer usable program code configured to initialize a state of the electronic presentation session between the presenter and each member of the audience to allow the audience to only view the digital content being presented.

17. The computer program product of claim 15, wherein the receiving of the content changes during the presentation further comprises:
computer usable program code configured to, upon receipt of an edit request from an audience member via the user interface, ascertain permissions of the audience member for editing the digital content of the presentation source file, wherein the permissions for editing the presentation source file are defined by at least one of an electronic presentation system, a file management system housing the presentation source file, and
an operating system;
computer usable program code configured to, responsive to the ascertained permissions of the audience member indicating that the audience member is allowed to edit the digital content, change the state of the electronic presentation session for the audience member that sent the edit request to allow editing of the digital content, wherein the state of the electronic presentation session for a remainder of the audience remains unchanged; and
computer usable program code configured to provide the audience member with a content editor appropriate for a type of the presentation source file, wherein the content changes are made to the presentation source file within the content editor.

18. The computer program product of claim 17, further comprising:
computer usable program code configured to, responsive to the ascertained permissions of the audience member indicating that the audience member is not allowed to edit the digital content, deny the edit request from the audience member, wherein the state of the electronic presentation session for the audience member remains unchanged from the initialized state.

19. The computer program product of claim 15, wherein modifying the original content further comprises:
computer usable program code configured to bifurcate the received content changes into updates to a portion of the digital content yet to be presented and updates to a portion of the digital content already presented; and
computer usable program code configured to update the portion of the digital content yet to be presented in a different manner from the portion of the digital content already presented.

20. The computer program product of claim 19, wherein the portion of the digital content yet to be presented is updated during the electronic presentation session, and wherein the portion of the digital content already presented is updated after the electronic presentation session has ended.

* * * * *